(No Model.)
C. H. POLSEY & A. A. SMITH.
MILLING CUTTER.
No. 327,107. Patented Sept. 29, 1885.
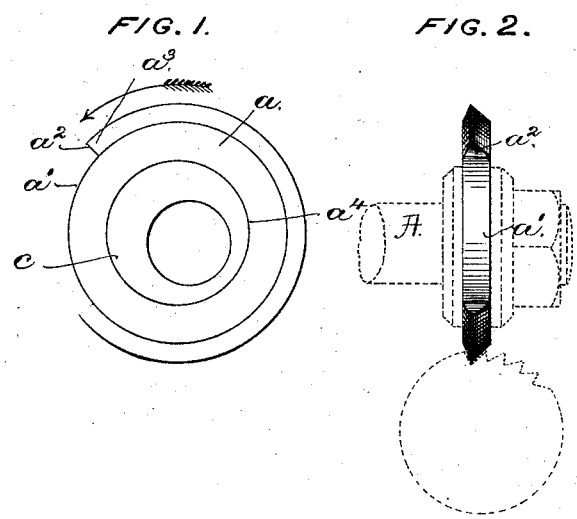

UNITED STATES PATENT OFFICE.

CHARLES H. POLSEY AND ALSON A. SMITH, OF NEWTON, MASSACHUSETTS.

MILLING-CUTTER.

SPECIFICATION forming part of Letters Patent No. 327,107, dated September 29, 1885.

Application filed March 2, 1885. (No model.)

*To all whom it may concern:*

Be it known that we, CHARLES H. POLSEY and ALSON A. SMITH, both of Newton, county of Middlesex, and State of Massachusetts, have invented an Improvement in Cutters, of which the following description, in connection with the accompanying drawings, is a specification, like letters on the drawings representing like parts.

Our invention relates to a cutter such as employed for cutting wood or metal, the cutter being rotated upon a suitable arbor and acting on the material to be cut during its rotation.

Cutters of this kind usually have a steep or nearly radial cutting-face, the outline of which is of the shape that it is desired to give the recess or groove in the material to be cut, and in cutters as heretofore made it is necessary that the metal of the cutter at the rear of the cutting-face should be beveled or inclined away from the edge or outline of the said face, in order to afford what is technically called "clearance," which is necessary for the cutters to act properly on the material.

As heretofore made it has been necessary to thus bevel the cutter at the rear of the cutting-face, or to provide for clearance by grinding the cutter, and then when the cutting-edge has become dull, and it is required to renew it by grinding the cutting-face, the outline of the cutting-face will not be changed either in shape or size as it recedes into the beveled portion at the rear of it.

Our invention consists, essentially, of a cutter composed of a disk having a circular periphery of the shape in radial section required for the cutting-face, the periphery of the disk being notched or cut away for a short distance, leaving the portion of full diameter terminating in a radial or nearly radial face, which forms the cutting-face of the cutter, and in order to provide for clearance the cutting disk is fastened eccentrically on its arbor with the cutting-face at or near the point of greatest throw, or eccentrically, so that the intact portion of the cutting-disk at the rear of the cutting-face falls off, or is beveled with relation to the cutting-face, which may be ground as required, for removing the metal toward the intact portion at the rear of the said cutting-face, after which, by placing the cutter with the cutter-face at the same eccentricity, as before, with relation to the arbor, the cutter will operate precisely the same as before, and the cutter may be used until the entire periphery has been worn away by successive grindings, the operation of the cutter being uniform throughout.

In practice the cutter will usually have an opening larger than the diameter of the mandrel, and preferably the mandrel will be provided with an eccentric hub or washer to fill the space between the mandrel and the cutter, thus holding the latter always in the same position with relation to the former or with the same eccentrically.

Figure 1 is a side elevation of a cutter embodying our invention, and Fig. 2 a front elevation or edge view thereof.

The cutter $a$ consists of a disk having its periphery of the outline desired for the cut or groove to be made in the material to be operated upon, being shown in Fig. 2 as of the proper shape to cut ratchet-teeth in the periphery of a metal disk, as indicated in dotted lines, Fig. 2. In order that the cutter may operate to cut the material, a portion of its edge is ground away, as shown at $a'$, leaving a plane and nearly radial face at one end of the said ground portion. Thus when the cutter $a$ is rotated and its periphery pressed toward or presented to the material to be cut, the said face $a^2$ in its rotation will strike the said material and remove a portion or chip therefrom, leaving a recess of the same shape in outline as the periphery of the disk in radial section, as shown in Fig. 2.

In order, however, that the cutting-face may act properly on the material to be cut, it is necessary that the material of the cutter at the rear of the cutting-face or at the part $a^3$, Fig. 1, should recede from the material through which the cutting-face is moving, affording what is technically termed "clearance." In order to accomplish this result without grinding away the metal of the cutter $a$, as has heretofore been practiced, the cutting-disk is set eccentrically to the arbor A, upon which it is rotated, as shown in Fig. 2, the cutting-face being somewhere near the portion of greatest throw, or, in other words, farthest from the axis of the arbor. By this arrangement the cutting-face $a^2$ moves in a circular path, the radius of which is equal to its distance from the said arbor, and the material of the cutter at $a^3$ at the rear of the cutting-face falls away or recedes from the said cutting-face, affording the desired clearance. In order to enable the cutter to be thus set eccentrically with relation to the arbor, with its cutting-face at the desired distance from the axis of rotation of the cutter, and in order that the cutting-face may always be set with the eccentric, so as to always operate uniformly on the material to be cut, the space between the arbor and the cutter is preferably filled by an eccentric washer or hub, $c$, which may be either fixed on the arbor or independent thereof. The cutter may be held upon the arbor by being clamped between collars, or by other usual means, and by varying the position of the cutting-face with relation to the throw or eccentricity of the cutter-disk the amount of clearance may be varied, it being somewhat greater when the said cutting-face is somewhat at the rear of the point of greatest throw or eccentricity in direction of the rotation of the cutter.

As the cutting-disk $a$ is itself concentric or circular, and its entire periphery of the same shape in radial section, the cutter may be sharpened by grinding the cutter-face $a^2$ until the entire periphery is used up or ground away, it being necessary only that after grinding the cutter shall be mounted on the arbor with the cutting-face $a^2$ always at the same point with relation to the centers of the arbor and cutter, or, in other words, with the same eccentricity.

A cutter of this kind is inexpensive, as its periphery may readily be turned to the desired shape, after which a portion of the periphery may be ground away, leaving a cutting-face at one or both ends of the said portion, as may be desired. It is obvious that a disk or annular cutter of this character might have its cutting-face at the interior of the cutter instead of the exterior, in which case the cutter will be mounted for use, with its cutting-face on the side nearer the axis of rotation, or with least throw or eccentricity.

It is not necessary that the circle limiting the cutting-disk should include the arbor or the axis thereof within it, as the said cutting-disk might be held by a suitable clamp wholly at one side of the axis of the arbor, the essential feature of the invention being that a cutter composed of a disk or plate having a circular or concentric periphery is mounted to turn on an axis eccentric thereto, so that the metal of the cutter falls away from or is beveled with relation to a cutting-face extending into its periphery, thus affording clearance of the cutting-face or edges without actual removal of material at the rear of the cutting-face.

The arbor is shown in dotted lines at A, Fig. 2.

We claim—

1. A cutter composed of a concentric or circular disk having its periphery shaped in radial section in correspondence with the shape desired for the cut to be made, the said cutter having a portion of its periphery ground away or notched, thereby providing a cutting-face, combined with an arbor and an eccentric, thereby providing clearance without grinding or removing the material of the cutter at the rear of the cutting-face, substantially as described.

2. The combination, with an arbor, of a cutter composed of a circular disk having its periphery of the shape in radial section desired for the cut, and having a portion of its periphery notched or cut away, the cutter also having a central opening of larger diameter than the arbor, and an eccentric entering the said opening and filling the space between the arbor and cutter, substantially as described.

In testimony whereof we have signed our names to this specification in the presence of two subscribing witnesses.

CHAS. H. POLSEY.
ALSON A. SMITH.

Witnesses:
  JOS. P. LIVERMORE,
  W. H. SIGSTON.